(12) United States Patent
Zhang et al.

(10) Patent No.: US 11,507,043 B2
(45) Date of Patent: Nov. 22, 2022

(54) METHOD AND SYSTEM FOR AUTOMATICALLY CONFIGURING I/O PORT

(71) Applicant: GREE ELECTRIC APPLIANCES, INC. OF ZHUHAI, Zhuhai (CN)

(72) Inventors: Wenhui Zhang, Zhuhai (CN); Wenhao Wu, Zhuhai (CN); Peng Ren, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 17/287,104

(22) PCT Filed: Jun. 13, 2019

(86) PCT No.: PCT/CN2019/091070
§ 371 (c)(1),
(2) Date: Apr. 20, 2021

(87) PCT Pub. No.: WO2020/113931
PCT Pub. Date: Jun. 11, 2020

(65) Prior Publication Data
US 2021/0356930 A1    Nov. 18, 2021

(30) Foreign Application Priority Data

Dec. 6, 2018    (CN) .......................... 201811489061.3

(51) Int. Cl.
*G06F 30/34*    (2020.01)
*G06F 3/06*    (2006.01)
(Continued)

(52) U.S. Cl.
CPC ......... *G05B 19/054* (2013.01); *G06F 13/102* (2013.01); *G06F 13/124* (2013.01); *H04L 67/12* (2013.01)

(58) Field of Classification Search
None
See application file for complete search history.

(56) References Cited

U.S. PATENT DOCUMENTS 5,535,342 A * 7/1996 Taylor ..................... G06F 30/34
710/11
5,603,043 A * 2/1997 Taylor ..................... G06F 30/34
716/132
(Continued)

FOREIGN PATENT DOCUMENTS

CN    101399816 A    4/2009
CN    101506786 A    8/2009
(Continued)

OTHER PUBLICATIONS

European Patent Office, extended European search report issued in U.S. Appl. No. 19892073.8 dated Jan. 4, 2022, Germany 6 pages.
(Continued)

*Primary Examiner* — Hyun Nam
(74) *Attorney, Agent, or Firm* — Kilpatrick Townsend & Stockton, LLP (57) ABSTRACT

The present disclosure provides a method and a system for automatically configuring an I/O port. The method applied to a central processor includes: receiving request information from a controlled device, the request information carrying a type of a signal required by the controlled device, and sending, according to the type of the signal, a configuration instruction to a control device, and instructing the control device to configure the I/O port according to the configuration instruction. The controlled device is connected to the central processing unit, or the controlled device is connected to the central processor by means of the control device.

10 Claims, 4 Drawing Sheets

(51) Int. Cl.
*G05B 19/05* (2006.01)
*G06F 13/10* (2006.01)
*G06F 13/12* (2006.01)
*H04L 67/12* (2022.01)

(56) References Cited

U.S. PATENT DOCUMENTS

| | | | | |
|---|---|---|---|---|
| 8,966,211 | B1* | 2/2015 | Arnon | G06F 13/102 |
| | | | | 709/224 |
| 2001/0052793 | A1* | 12/2001 | Nakaya | H03K 19/17736 |
| | | | | 326/41 |
| 2005/0130459 | A1* | 6/2005 | Sagues | G05B 19/054 |
| | | | | 439/76.1 |
| 2006/0155900 | A1* | 7/2006 | Sagues | G05B 19/0423 |
| | | | | 710/72 |
| 2011/0026337 | A1* | 2/2011 | Kwack | G11C 7/18 |
| | | | | 365/230.03 |
| 2011/0320640 | A1* | 12/2011 | Butler | H04L 41/12 |
| | | | | 710/8 |
| 2012/0233361 | A1* | 9/2012 | Dalal | G06F 1/3278 |
| | | | | 710/32 |
| 2014/0197696 | A1* | 7/2014 | Mooney | G06F 13/385 |
| | | | | 439/620.21 |
| 2016/0134269 | A1* | 5/2016 | Hayashi | H03K 9/08 |
| | | | | 329/312 |
| 2017/0168777 | A1* | 6/2017 | Britt | G06F 8/20 |
| 2018/0285225 | A1* | 10/2018 | Kumar | G06F 11/221 |
| 2021/0303495 | A1* | 9/2021 | Ichiyanagi | G05B 19/05 |
| 2021/0356930 | A1* | 11/2021 | Zhang | G05B 19/054 |

FOREIGN PATENT DOCUMENTS

| | | |
|---|---|---|
| CN | 202166887 U | 3/2012 |
| CN | 102629242 A | 8/2012 |
| CN | 102804105 A | 11/2012 |
| CN | 102866974 A | 1/2013 |
| CN | 103294630 A | 9/2013 |
| CN | 104950880 A | 9/2015 |
| CN | 105812167 A | 7/2016 |
| CN | 107645391 A | 1/2018 |
| CN | 108011970 A | 5/2018 |
| CN | 109766291 A | 5/2019 |
| WO | 2011130026 A2 | 10/2011 |

OTHER PUBLICATIONS

First office action received for corresponding Australian application No. 2019391752, dated Mar. 2, 2022, total 2 pages.

* cited by examiner

METHOD AND SYSTEM FOR AUTOMATICALLY CONFIGURING I/O PORT

CROSS REFERENCE TO RELATED APPLICATIONS

This application is based on and claims priority to Chinese Patent Application No. 201811489061.3, filed on Dec. 6, 2018, the entire content of which is incorporated herein in its entirety. This application is a national phase under 35 U.S.C. § 120 of international patent application PCT/CN2019/091070, entitled "METHOD AND SYSTEM FOR AUTOMATICALLY CONFIGURING I/O PORT" and filed on Jun. 13, 2019, the content of which is also hereby incorporated by reference.

FIELD

The present disclosure relates to a field of communication technology, and in particular, relates to a method and a system for automatically configuring an I\O port.

BACKGROUND

At present, automatic control devices such as programmable logic controllers (PLCs), or direct digital control (DDC,) systems are rapidly spreading. Such automatic control devices are mainly used for centralized control of various large-scale machineries or complex equipment. The control device itself integrates multiple types of input and output interfaces. These interfaces include digital input and output interfaces, and analog input and output interfaces. The analog input and output interfaces further include voltage input and output interfaces, current input and output interfaces, temperature sensing bulb detecting interface, and the like. In order to enhance the function of a port and improve the versatility of the port, the port is designed as a multiplexed mode. That is, circuits with all the above functions are integrated in one port. A software configuration method is used to switch the port to have any of the above functions. Due to different functions, the corresponding internal implementation circuits are different, so requirements for parameters of input and output signals are also different. If the input and output signals do not match the interface, the control device or a controlled device is easy to be damaged.

However, a configuration method for an I/O port includes manually verifying types and parameters of an output signal or an input signal required by an external controlled device, and configuring the functions of the I/O port of the control device via a software to match the types of the input or output signals of the controlled device, and finally connecting the input and output interfaces between two modules. Nevertheless, an operator may forget to cut off the input and output interfaces and configure the control device, or an engineer may misoperate during in the process of configuring the port type of the control device, which will cause the input and output signals not to match the port type, thus causing damage to the control device or the controlled device.

Regarding the problem that the device is damaged due to improper operation in the process of manually configuring the I/O port in the related art, no effective solution has been proposed yet.

SUMMARY

At least some of the embodiments of the present disclosure provide a method and a system for automatically configuring an I/O port, to at least partially solve a problem that a device is damaged due to improper operation in a process of manually configuring the I/O port in the related art.

In one of the embodiments according to the present disclosure, a system for automatically configuring an I/O port is provided, and the system includes a central processing unit, a control device, and a controlled device.

The controlled device is connected to the central processing unit or connected to the central processing unit via the control device, and is configured to send request information to the central processing unit, and the request information carries a type of a signal required by the controlled device.

The central processing unit is connected to the control device, and is configured to send a configuration instruction to the control device according to the type of the signal.

The control device is configured to configure the I/O port according to the configuration instruction.

In one embodiment, when the controlled device is connected to the central processing unit, the controlled device is connected to the central processing unit via a communication line or a feedback response line.

When the controlled device is connected to the central processing unit via the control device, the controlled device is connected to the control device via the communication line or the feedback response line.

In one embodiment, the central processing unit is further configured to receive the request information sent by the controlled device when the controlled device is connected to the central processing unit, and receive the request information sent from the controlled device to the control device and forwarded by the control device when the controlled device is connected to the central processing unit via the control device.

In one embodiment, the control device is further configured to, after configuring the I/O port according to the configuration instruction, feedback information that the I/O port has been successfully configured to the central processing unit.

The central processing unit is further configured to, after receiving the information that the I/O port has been successfully configured, send an instruction to the control device or the controlled device according to the type of the signal.

In one of the embodiments according to the present disclosure, a method for automatically configuring an I/O port, applied to the central processing unit above, includes:

receiving the request information from the controlled device, the request information carrying the type of the signal required by the controlled device; and sending the configuration instruction to the control device according to the type of the signal, and instructing the control device to configure the I/O port according to the configuration instruction;

the controlled device is connected to the central processing unit, or the controlled device is connected to the central processing unit via the control device.

In one embodiment, when the controlled device is connected to the central processing unit, the receiving the request information from the controlled device includes:

receiving the request information sent by the controlled device; and when the controlled device is connected to the central processing unit via the control device, the receiving the request information from the controlled device includes:

receiving the request information sent from the controlled device to the control device and forwarded by the control device.

In one embodiment, after the sending the configuration instruction to the control device according to the type of the signal and instructing the control device to configure the I/O port, the method further includes:

receiving information fed back by the control device that the I/O port has been successfully configured; and sending an instruction to the control device or to the controlled device according to the type of the signal.

In one embodiment, the type of the signal is any one of the following six types:

an analog voltage input signal, an analog current input signal, a digital voltage input signal, an analog voltage output signal, an analog current output signal, and a digital voltage output signal.

In one embodiment, the sending the instruction to the control device according to the type of the signal includes:

when the type of the signal is any one of the analog voltage input signal, the analog current input signal, and the digital voltage input signal, sending control information to the control device, so that the control device sends the signal to the controlled device according to the control information.

The instruction includes the control information.

In one embodiment, when the controlled device is connected to the central processing unit, the instruction is sent to the controlled device according to the type of the signal.

The sending the instruction to the controlled device according to the type of the signal includes: when the type of the signal is any one of the analog voltage output signal, the analog current output signal, and the digital voltage output signal, sending identification information to the controlled device.

The instruction comprises the identification information; the identification information is configured to inform the controlled device that the I/O port has been successfully configured, so that the controlled device sends the signal to the control device.

In one embodiment, when the controlled device is connected to the central processing unit via the control device, the instruction is sent to the control device according to the type of the signal. The sending the instruction to the control device according to the type of the signal includes:

when the type of the signal is any one of the analog voltage output signal, the analog current output signal, and the digital voltage output signal, sending identification information to the control device, so that the control device forwards the identification information to the controlled device.

The instruction comprises the identification information; the identification information is configured to inform the controlled device that the I/O port has been successfully configured, so that the controlled device sends the signal to the control device.

In one embodiment, the controlled device is any one of a sensor, a valve, and a motor.

In one of the embodiments according to the present disclosure, a method for automatically configuring an I/O port is further provided. The method is applied to the controlled device as described above. The method includes:

sending the request information to the central processing unit. The request information carries the type of the signal required by the controlled device, so that the central processing unit sends the configuration instruction to the control device according to the type of the signal.

The configuration instruction is configured to instruct the control device to configure the I/O port; the controlled device is connected to the central processing unit, or, the controlled device is connected to the central processing unit via the control device.

In one embodiment, when the controlled device is connected to the central processing unit, the sending the request information to the central processing unit includes:

sending the request information to the central processing unit.

When the controlled device is connected to the central processing unit via the control device, the sending the request information to the central processing unit includes:

sending the request information to the control device, and forwarding, by the control device, the request information to the central processing unit.

In one embodiment, the controlled device is any one of a sensor, a valve, and a motor.

In the embodiments of the present disclosure, the request information from the controlled device is received, and the request information carries the type of the signal required by the controlled device. The configuration instruction is sent to the control device according to the type of the signal, to instruct the control device to configure the I/O port according to the configuration instruction. The controlled device is connected to the central processing unit, or the controlled device is connected to the central processing unit via the control device. Thus, a communication link between the central processing unit and the controlled device is established, so that the central processing unit can automatically generate the configuration instruction according to the type of the signal required by the controlled device, to instruct the control device to configure the I/O port. In this way, the I/O port is automatically configured, thereby realizing unmanned operation, and avoiding the risk of manual improper operation.

DETAILED DESCRIPTION OF THE EMBODIMENTS

The present disclosure will be further described in detail below with reference to the accompanying drawings and embodiments. It should be understood that the embodiments described herein are only used to illustrate the present disclosure, but not intended to limit the present disclosure.

In the following description, suffixes such as "module", "component" or "unit" used to indicate an element is only for facilitating the illustration of the present disclosure, and has no specific meaning in itself. Therefore, the "module", "component" or "unit" can be used in a mixed manner.

Figure 1:
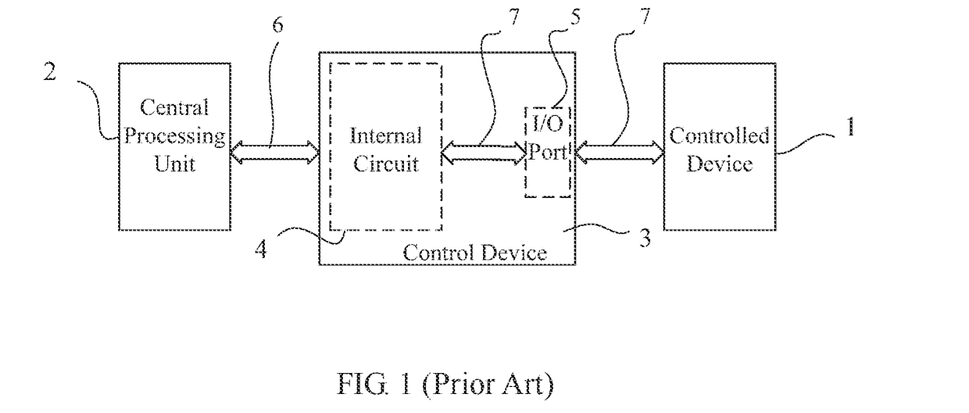
FIG. 1 is a structural block diagram illustrating a system for manually configuring an I/O port according to related art.

In order to introduce the solutions of the following embodiments of the present disclosure more clearly, connection relations and signal transmission processes between a central processing unit 2, a control device 3, and a controlled device 1 in the related embodiments are briefly introduced. As shown in FIG. 1, an engineer first verifies and confirms types and parameters of signals to be output from or input to the external controlled device 1. Then, software codes in the control device 3 are set as parameters matching the types and the parameters of the signals to be output or input. Then, the central processing unit 2 is manually configured according to the types and the parameters of the signals to be output or input, so that the central processing unit 2 outputs correct control information, which is transmitted to the control device via a communication signal 6. In this way, a corresponding I/O port 5 of the control device 3 is configured to be in a corresponding mode. A function of an I/O port of the controlled device 1 is determined by a type of the controlled device 1, and is fixed. The central processing unit 2 configures a type of the I/O port 5 of the control device 3 to match a type of the I/O port of the controlled device 1 according to the type of the I/O port of the controlled device 1. Finally, the controlled device 1 is connected to the control device 3 via the I/O port 5. Corresponding to the above-mentioned control process, the communication signal 6 is transmitted between the central processing unit 2 and the control device 3. When the I/O port 5 is successfully configured, a device signal 7 is transmitted between the controlled device 1 and the control device 3. The control device 3 includes an internal circuit 4 and the I/O port 5 therein. The device signal 7 may be transmitted to the internal circuit 4 via the I/O port 5. It should be noted that when the I/O port 5 is successfully configured, the device signal 7 may be transmitted between the controlled device 1 and the I/O port 5, and between the I/O port 5 and the internal circuit 4. The communication signal 6 may be transmitted between the control device 3 and the central processing unit 2.

It should be noted that the controlled device 1 may generate an output signal and output it to the control device 3, and the control device 3 may monitor working condition information of the controlled device 1 according to the output signal. The controlled device 1 may further receive an output signal (a control signal) generated by the control device 3, and the control device 3 may control the action of the controlled device 1 according to the output signal. The controlled device 1 may further simultaneously output a signal to the control device 3 and receive the output signal generated by the control device 3, which is not limited in the present disclosure.

Figure 2:
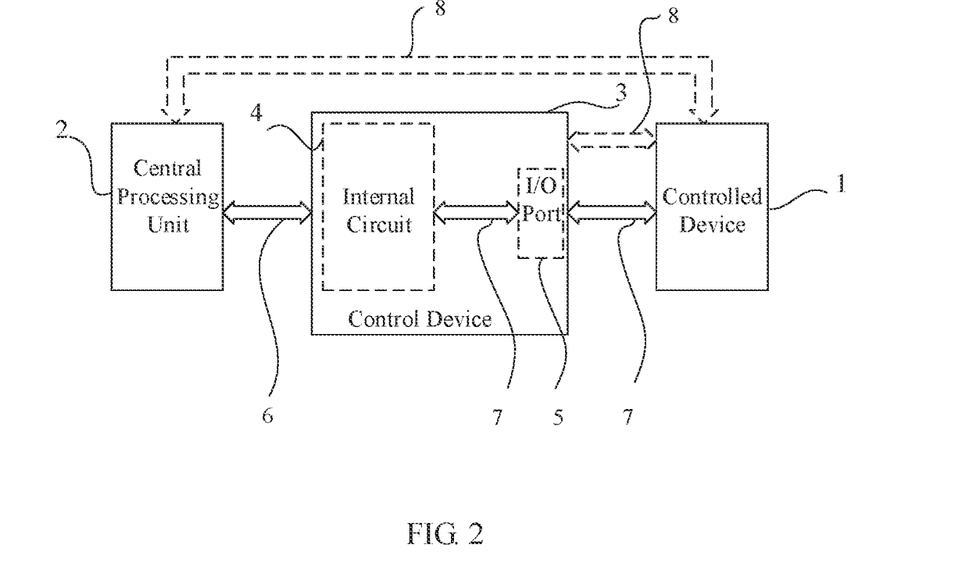
FIG. 2 is a structural block diagram illustrating a system for automatically configuring an I/O port according to one of embodiments of the present disclosure.

With reference to the specific introduction of the solutions in the related art as described above and the background, it is known that in the related art, the I/O port is manually configured, which is likely to cause a problem of device damage due to improper operation. To solve this problem, embodiments of the present disclosure provide a system for automatically configuring an I/O port. FIG. 2 is a structural block diagram illustrating a system for automatically configuring an I/O port according to one of the embodiments of the present disclosure. As shown in FIG. 2, the system includes a central processing unit 2, a control device 3, and a controlled device 1.

The controlled device 1 is connected to the central processing unit 2, or connected to the central processing unit 2 via the control device 3, and is configured to send request information to the central processing unit 2. The request information carries a type of the signal required by the controlled device 1. The central processing unit 2, which is connected to the control device 3, is configured to send a configuration instruction to the control device 3 by transmitting a communication signal 6 according to the type of the signal. The control device 3 is configured to configure the I/O port 5 according to the configuration instruction.

As shown by the dashed line in FIG. 2, in a case that the controlled device 1 is connected to the central processing unit 2, the controlled device 1 is connected to the central processing unit 2 via a communication line or a feedback response line 8. In a case that the controlled device 1 is connected to the central processing unit 2 via the control device 3, the controlled device 1 is connected to the control device 3 via the communication line or the feedback response line 8.

It should be noted that the controlled device 1 may be connected to the central processing unit 2 via the communication line or the feedback response line 8. When the controlled device 1 is far away from the central processing unit 2, it is inconvenient to connect the controlled device 1 to the central processing unit 2. The controlled device 1 is also connected to the control device 3 via the communication line or the feedback response line 8, thus a communication path with the central processing unit 2 is established indirectly. Accordingly, an operation of automatic identification and a port matching is performed between the controlled device 1 and the control device 3.

In a possible embodiment, the central processing unit 2 is configured to receive the request information sent by the controlled device 1 when the controlled device 1 is connected to the central processing unit 2, and receive the request information sent from the controlled device 1 to the control device 3 and forwarded by the control device 3 when the controlled device 1 is connected to the central processing unit 2 via the control device 3. The control device 3 is further configured to, after configuring the I/O port 5 according to the configuration instruction, feedback configuration information of the I/O port to the central processing unit 2. The central processing unit 2 is further configured to, when receiving the configuration information of the I/O port, send control information to the control device 3 according to the type of the signal (when the type of the signal is an input signal), to instruct the control device 3 to send the signal to the controlled device 1, so that a communication connection between the controlled device 1 and the control device 3 is established via the I/O port 5 and works normally. In one embodiment, the central processing unit 2 is further configured to, after receiving the information that the I/O port has been configured successfully, send identification information to the controlled device 1 according to the type of the signal (when the type of the signal is an output signal), to inform the controlled device 1 that the configuration for the I/O port has been succeeded, so that the controlled device 1 sends the signal to the control device 3 to enable a normal operation therebetween. The controlled device 1 shown in FIG. 2 includes the internal circuit 4 and the I/O port 5. When the I/O port 5 is successfully configured, the device signal 7 may be transmitted between the controlled device 1 and the I/O port 5. The device signal 7 may be transmitted between the I/O port 5 and the internal circuit 4. The communication signal 6 may be transmitted between the control device 3 and the central processing unit 2.

The device signal 7 is a driving or control signal (usually an analog signal) such as a voltage and a current transmitted between the devices when the devices are operating normally (after the I/O port 5 is successfully configured). The communication signal 6 is a signal (usually a digital signal, usually with an agreed signal format) transmitted during communication between devices.

Thus, a communication link between the central processing unit and the controlled device is established, so that the central processing unit can automatically generate the configuration instruction according to the type of the signal required by the controlled device, to instruct the control device to configure the I/O port. In this way, the I/O port is automatically configured, realizing unmanned operation, and avoiding the risk of manual improper operation.

Figure 3:
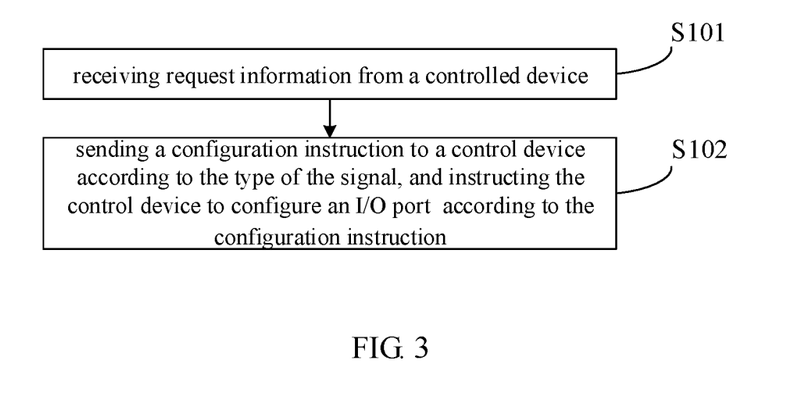
FIG. 3 is a flowchart of a method for automatically configuring an I/O port according to a first embodiment of the present disclosure.

FIG. 3 shows a method for automatically configuring the I/O port according to a first embodiment of the present disclosure. The method is applied to the central processing unit of the system shown in FIG. 2. The method includes the following steps.

At step S101, request information from a controlled device is received.

The request information carries a type of a signal required by the controlled device.

At step S102, a configuration instruction is sent to a control device according to the type of the signal, to instruct the control device to configure the I/O port according to the configuration instruction.

The controlled device is connected to the central processing unit. In one embodiment, the controlled device is connected to the central processing unit via a control device.

Thus, a communication link between the central processing unit and the controlled device is established, so that the central processing unit can automatically generate the configuration instruction according to the type of the signal required by the controlled device, to instruct the control device to configure the I/O port. Thus the I/O port is automatically configured, realizing the unmanned operation, and avoiding the risk of manual improper operation.

The controlled device is any one of a sensor, a valve, and a motor. The central processing unit is a kind of a master computer, and the control device is a kind of a slave computer.

In a possible embodiment, when the controlled device is connected to the central processing unit, the step S101 of receiving the request information from the controlled device includes receiving the request information sent by the controlled device. When the controlled device is connected to the central processing unit via the control device, the step S101 of receiving the request information from the controlled device includes receiving the request information sent from the controlled device to the control device and forwarded by the control device.

It is understood that the request information is the information requesting the central processing unit to provide services for the controlled device. The central processing unit may instruct the control device to configure the I/O port according to the request information, to establish a connection basis for subsequent services provided for the controlled device.

Figure 4:
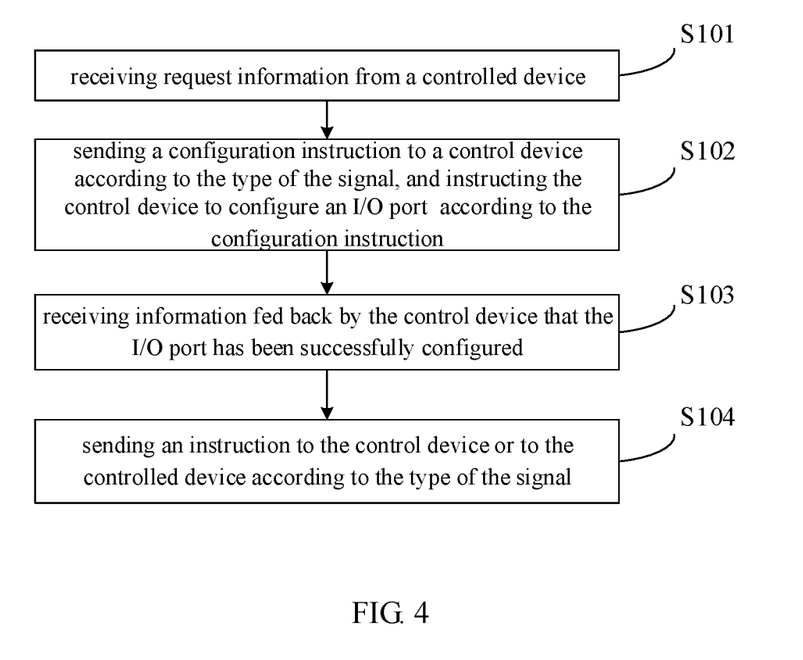
FIG. 4 is a flowchart of a method for automatically configuring an I/O port according to an operational second embodiment of the present disclosure.

In a possible embodiment, FIG. 4 is a flowchart of a method for automatically configuring an I/O port according to a second embodiment of the present disclosure. As shown in FIG. 4, after the step S102 of sending the configuration instruction to the control device according to the type of the signal to instruct the control device to configure the I/O port, the method further includes the following steps.

At step S103, configuration information of the I/O port fed back by the control device is received.

At step S104, an instruction is sent to the control device or a controlled device according to the type of the signal.

Figure 5:
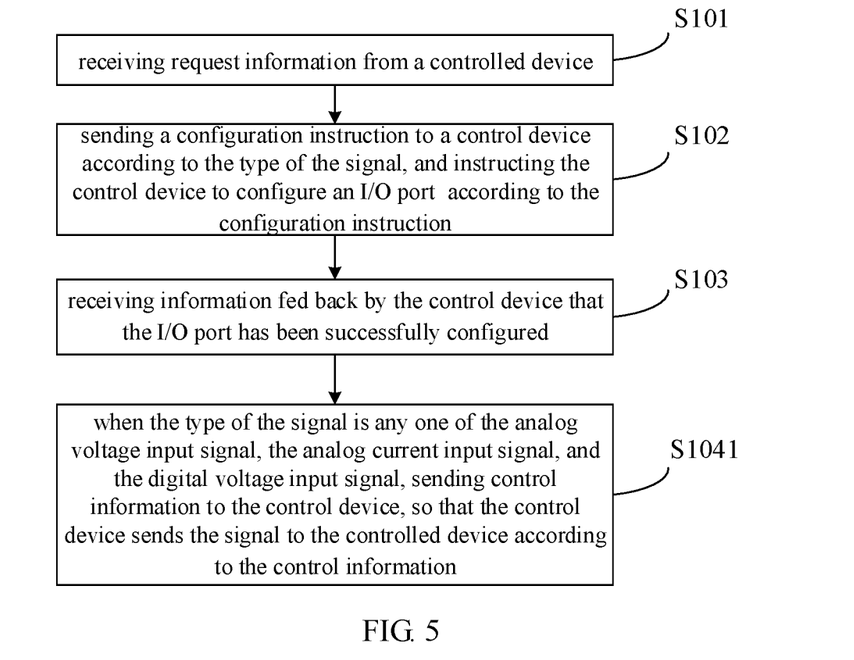
FIG. 5 is a flowchart of a method for automatically configuring an I/O port according to an operational third embodiment of the present disclosure.

In a possible embodiment, the type of the signal is any one of the following six types: an analog voltage input signal, an analog current input signal, a digital voltage input signal, an analog voltage output signal, an analog current output signal, and a digital voltage output signal. Therefore, when the instruction is sent to the control device according to the type of the signal, as shown in FIG. 5, a flowchart of a method for automatically configuring an I/O port according to a third embodiment of the present disclosure, the step S104 of sending the instruction to the control device according to the type of the signal includes a step S1041. At the step S1041, when the type of the signal is any one of the analog voltage input signal, the analog current input signal, and the digital voltage input signal, control information is sent to the control device, so that the control device sends the signal to the controlled device according to the control information.

The instruction includes the control information. It is understood that when the controlled device requires the control device to input the signal to the controlled device, the central processing unit may send the instruction to the control device according to the type of the signal. In this case, the instruction is the control information, and the control device may send the signal to the controlled device according to the control information.

Figure 6:
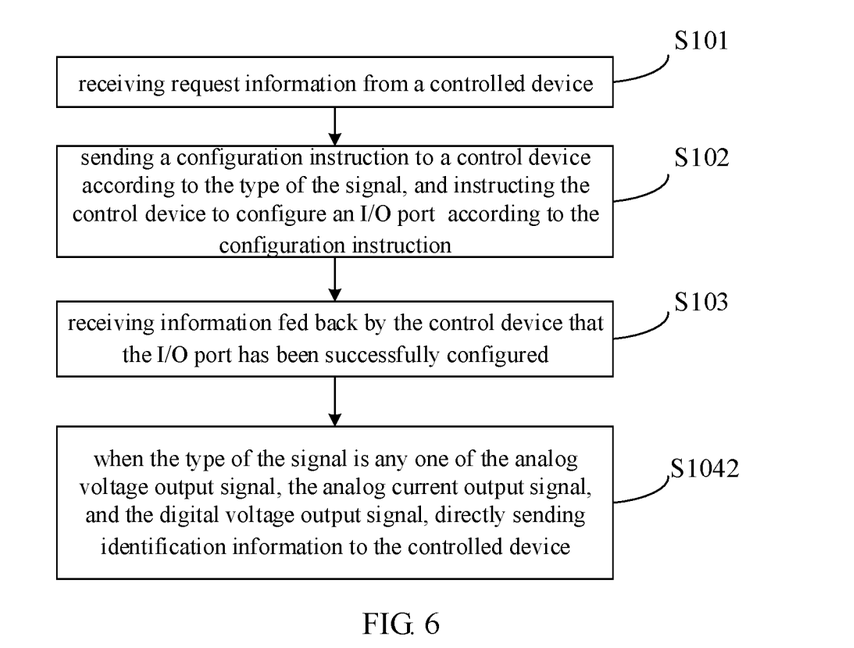
FIG. 6 is a flowchart of a method for automatically configuring an I/O port according to a fourth embodiment of the present disclosure.

In a possible embodiment, when the controlled device is connected to the central processing unit, and when the instruction is sent to the controlled device according to the type of the signal, as shown in FIG. 6, a flowchart of a method for automatically configuring an I/O port according to a fourth embodiment of the present disclosure, the step S104 of sending the instruction to the controlled device according to the type of the signal includes a step S1042. At the step S1042, when the type of the signal is any one of the analog voltage output signal, the analog current output signal, and the digital voltage output signal, identification information is sent to the controlled device. The instruction includes the identification information. The identification information is configured to inform the controlled device that the configuration for the I/O port has been succeeded, so that the controlled device sends the signal to the control device.

It is understood that when the controlled device needs to output the signal to the control device, the central processing unit may send an instruction to the controlled device according to the type of the signal. In this case, the instruction is the identification information. The identification information is configured to inform the controlled device that the I/O port has been successfully configured, and that the controlled device may output the signal to the control device.

In a possible embodiment, when the controlled device is connected to the central processing unit via the control device, and when the instruction is sent to the controlled device according to the type of the signal, the step S104 of sending the instruction to the controlled device according to the type of the signal includes: when the type of the signal is any one of the analog voltage output signal, the analog current output signal, and the digital voltage output signal, sending the identification information to the control device, so that the control device forwards the identification information to the controlled device. The identification information is configured to instruct the controlled device to send the signal to the control device.

It is understood that the difference between this embodiment and the previous embodiment is that, in the previous embodiment, a direct connection relation is established between the central processing unit and the controlled device, thus the identification information may be sent to the controlled device. However, in this embodiment, a connection relation between the central processing unit and the controlled device is established by means of the control device, thus the identification information needs to be sent to the control device firstly, and then the control device forwards the identification information to the controlled device.

It should be noted that the controlled device is any sensor, such as a temperature sensor, a driving motors, or any other actuator. When powered on, the controlled device sends the request information firstly to the central processing unit via the communication line or the feedback response line, or sends the request information to the central processing unit via the control device. The request information carries the type of the input or output signals required by the controlled device itself. The central processing unit generates the configuration instruction according to the type of the signal, and sends the configuration instruction to the control device. After receiving the configuration instruction, the control device may complete configuring the I/O port and feedback the information that the I/O port has been successfully configured to the central processing unit. After receiving the information that the I/O port has been successfully configured, the central processing unit may inform the controlled device that the configuration for the I/O port is completed when the type of the signal is a type of an output signal (that is, the controlled device needs to output the signal to the control device). In one embodiment, after receiving the information that the I/O port has been successfully configured, the central processing unit may send control information to the control device, so that the control device outputs the signal to the controlled device. In addition, relevant codes need to be added to an underlying program of the control device, to achieve automatic configuration for the I/O port and transmission of signals when the configuration is completed.

When the type of the signal is the type of the output signal, the central processing unit may inform the controlled device that the I/O port has been successfully configured, so that the controlled device can output the signal to the control device, preventing the control device from being damaged due to receiving the signal without preparation. In addition, manual operation for the controlled device to enable it output the signal is avoided, improving the configuration efficiency. It should be noted that, after receiving the information that the I/O port has been successfully configured, the controlled device outputs the signal. In one embodiment, a prompt message may be issued to remind the user to manipulate the controlled device to enable it to output the signal. In some embodiments, these two modes are set by the user according to actual needs, and are not limited herein by the present disclosure.

Embodiments of the present disclosure illustrate a method for automatically configuring an I/O port. The method is applied to the controlled device shown in FIG. 2. The method includes sending request information to a central processing unit. The request information carries a type of a signal required by the controlled device, so that the central processing unit sends a configuration instruction to a control device according to the type of the signal. The configuration instruction is used to instruct the control device to perform a configuration for the I/O port. The controlled device is connected to the central processing unit, or the controlled device is connected to the central processing unit via the control device.

In a possible embodiment, in a case that the controlled device is connected to the central processing unit, the sending the request information to the central processing unit includes sending the request information to the central processing unit. In a case that the controlled device is connected to the central processing unit via the control device, the sending the request information to the central processing unit includes sending the request information to the control device, so that the control device forwards the request information to the central processing unit.

Thus, a communication link between the central processing unit and the controlled device may be established, so that the central processing unit may automatically generate the configuration instruction according to the type of the signal required by the controlled device, to instruct the control device to configure the I/O port. Thus, the I/O port is automatically configured, realizing the unmanned operation and avoiding the risk of manual improper operation.

Figure 7:
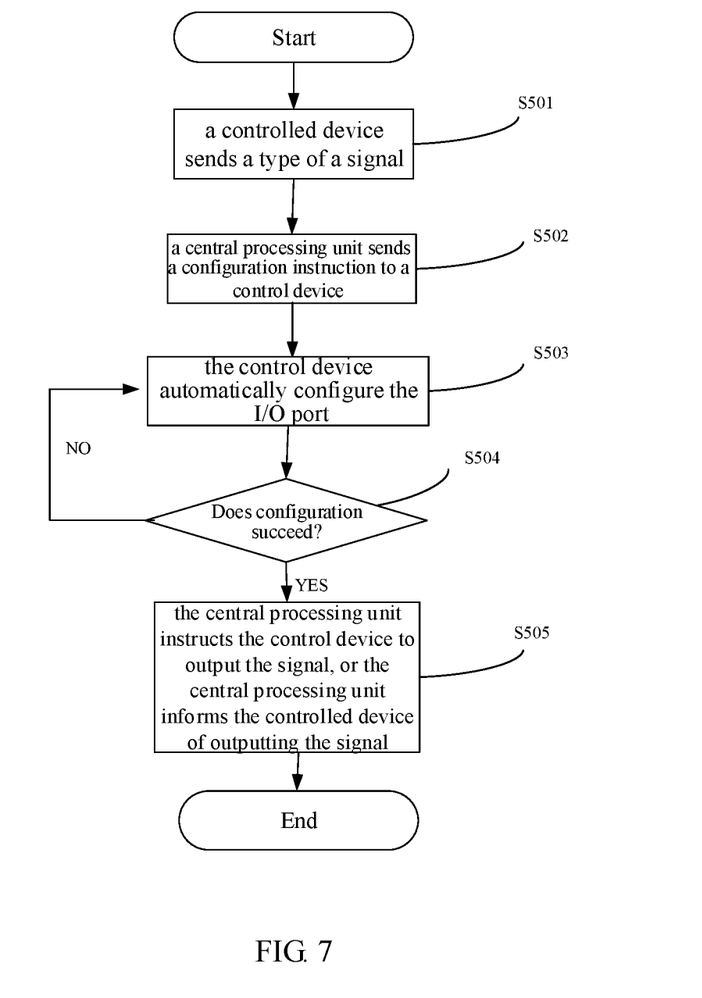
FIG. 7 is a flowchart of a method for automatically configuring an I/O port according to an operational fifth embodiment of the present disclosure.

FIG. 7 is a flowchart of a method for automatically configuring an I/O port according to a fifth embodiment of the present disclosure. As shown in FIG. 7, the method includes following steps.

At Step S501, a controlled device (a controlled module) sends a type of a signal.

At Step S502, a central processing unit sends a configuration instruction to a control device.

At Step S503, the control device automatically configures an I/O port.

At Step S504, whether a configuration has been successfully completed is determined. If yes, the step S405 is performed. If not, the step S403 is performed;

Step S505: the central processing unit instructs the control device to output the signal, or the central processing unit informs the controlled device of outputting the signal.

Thus, a communication link between the central processing unit and the controlled device may be established, so that the central processing unit may automatically generate the configuration instruction according to the type of the signal required by the controlled device, to instruct the control device to configure the I/O port. Thus, the I/O port is automatically configured, realizing the unmanned operation and avoiding the risk of the manual improper operation.

It should be noted that in this disclosure, the terms "include", "comprise" or any other variants thereof are intended to encompass non-exclusive inclusion, so that a process, a method, an article, or a device including a series of elements not only includes those elements, but also includes other elements not explicitly listed, or includes elements inherent to the process, the method, the article, or the device. If there are no more limitations, the element defined by the sentence "including a . . . " does not exclude the existence of other identical elements in the process, the method, the article, or the device including the element.

The sequence numbers of the above-mentioned embodiments of the present disclosure are only for description, and do not represent the priorities of the embodiments.

Through the description of the above embodiments, the methods of the above-mentioned embodiments can be implemented by means of software and a necessary general hardware platform. Of course, it can also be implemented by hardware, but in many cases the former is preferable. Based on this understanding, the embodiments of the present disclosure essentially or the part thereof that contributes to the related art may be embodied in a form of a software product. The computer software product is stored in a storage medium (such as ROM/RAM, magnetic disk, optical disc), and includes several instructions to enable a mobile terminal (which is a mobile phone, a computer, a server, an air conditioner, a network device, or the like) to perform the methods of the various embodiments of the present disclosure.

What is claimed is:

1. A system for automatically configuring an I/O port, comprising a central processing unit, a control device, and a controlled device, wherein:
the controlled device is connected to the central processing unit or connected to the central processing unit via the control device, and is configured to send request information to the central processing unit, and the request information carries a type of a signal required by the controlled device;
the central processing unit is connected to the control device, and is configured to send a configuration instruction to the control device according to the type of the signal; and
the control device is configured to configure the I/O port according to the configuration instruction, and further configured to, after configuring the I/O port according to the configuration instruction, feedback information that the I/O port has been successfully configured to the central processing unit;
the central processing unit is further configured to, after receiving the information that the I/O port has been successfully configured, send an instruction to the control device or the controlled device according to the type of the signal, wherein the central processing unit being configured to send the instruction to the control device or the controlled device according to the type of the signal comprises:
when the type of the signal is an input signal, the central processing unit being configured to send control information to the control device, to instruct the control device to send the input signal to the controlled device; and
when the type of the signal is an output signal, the central processing unit being configured to: when a direct connection relation is established between the central processing unit and the controlled device, send identification information to the controlled device, and when a connection relation between the central processing unit and the controlled device is established by means of the control device, send the identification information to the controlled device by means of the control device; wherein, the identification information is configured to inform the controlled device that a configuration for the I/O port has been succeeded, so that the controlled device sends the output signal to the control device.

2. The system according to claim 1, wherein:
when the controlled device is connected to the central processing unit, the controlled device is connected to the central processing unit via a communication line or a feedback response line; and
when the controlled device is connected to the central processing unit via the control device, the controlled device is connected to the control device via the communication line or the feedback response line.

3. The system according to claim 1, wherein
the central processing unit is further configured to receive the request information sent by the controlled device when the controlled device is connected to the central processing unit, and receive the request information sent from the controlled device to the control device and forwarded by the control device when the controlled device is connected to the central processing unit via the control device.

4. The system according to claim 1, wherein:
the control device comprises an internal circuit and the I/O port, and
a device signal is transmitted to the internal circuit via the I/O port.

5. A method for automatically configuring an I/O port, comprising:
a central processing unit receiving a request information from a controlled device, the request information carrying a type of a signal required by a controlled device; and
the central processing unit sending a configuration instruction to a control device according to the type of the signal, and instructing the control device to configure the I/O port according to the configuration instruction;
the controlled device being connected to the central processing unit, or the controlled device being connected to the central processing unit via the control device
the central processing unit receiving information fed back by the control device that the I/O port has been successfully configured;
the central processing unit sending an instruction to the control device or to the controlled device
according to the type of the signal, wherein the central processing unit sending the instruction to the control device or the controlled device according to the type of the signal comprises:
when the type of the signal is an input signal, the central processing unit sending control information to the control device, to instruct the control device to send the input signal to the controlled device; and
when the type of the signal is an output signal, the central processing unit sending identification information to the controlled device when a direct connection relation is established between the central processing unit and the controlled device, and sending the identification information to the controlled device by means of the control device when a connection relation between the central processing unit and the controlled device is established by means of the control device; wherein, the identification information is configured to inform the controlled device that a configuration for the I/O port has been succeeded, so that the controlled device sends the output signal to the control device.

6. The method according to claim 5, wherein:
when the controlled device is connected to the central processing unit, the central processing unit receiving the request information from the controlled device comprises:
the central processing unit receiving the request information sent by the controlled device; and
when the controlled device is connected to the central processing unit via the control device, the central processing unit receiving the request information from the controlled device comprises:

the central processing unit receiving the request information sent from the controlled device to the control device and forwarded by the control device.

7. The method according to claim 5, wherein the type of the signal comprises the input signal and the output signal; the input signal is any one of following three types: an analog voltage input signal, an analog current input signal, a digital voltage input signal, and the output signal is any one of following three types: an analog voltage output signal, an analog current output signal, and a digital voltage output signal.

8. The method according to claim 5, wherein the controlled device is any one of a sensor, a valve, and a motor.

9. A computer device, comprising a memory, a processor, and computer programs stored in the memory and executed by the processor, wherein the programs, when executed by the processor, cause the processor to perform the method for automatically configuring the I/O port according to claim 5.

10. A non-transitory storage medium containing computer executable instructions, wherein the computer executable instructions, when executed by a computer processor, cause the computer processor to perform the method for automatically configuring the I/O port according to claim 5.

* * * * *